Feb. 12, 1952
S. DE SILVESTRO
2,585,748
AIR-COOLING AND HEATING APPARATUS
Filed Oct. 6, 1948
2 SHEETS—SHEET 2
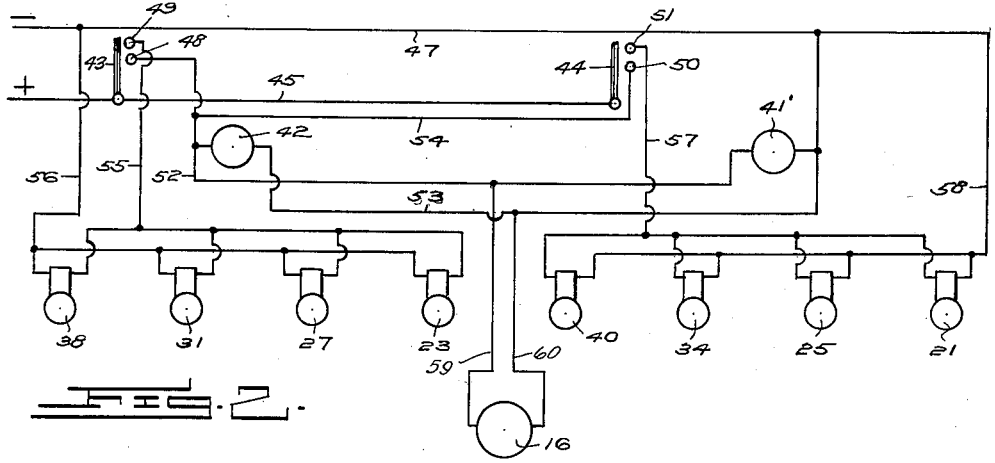
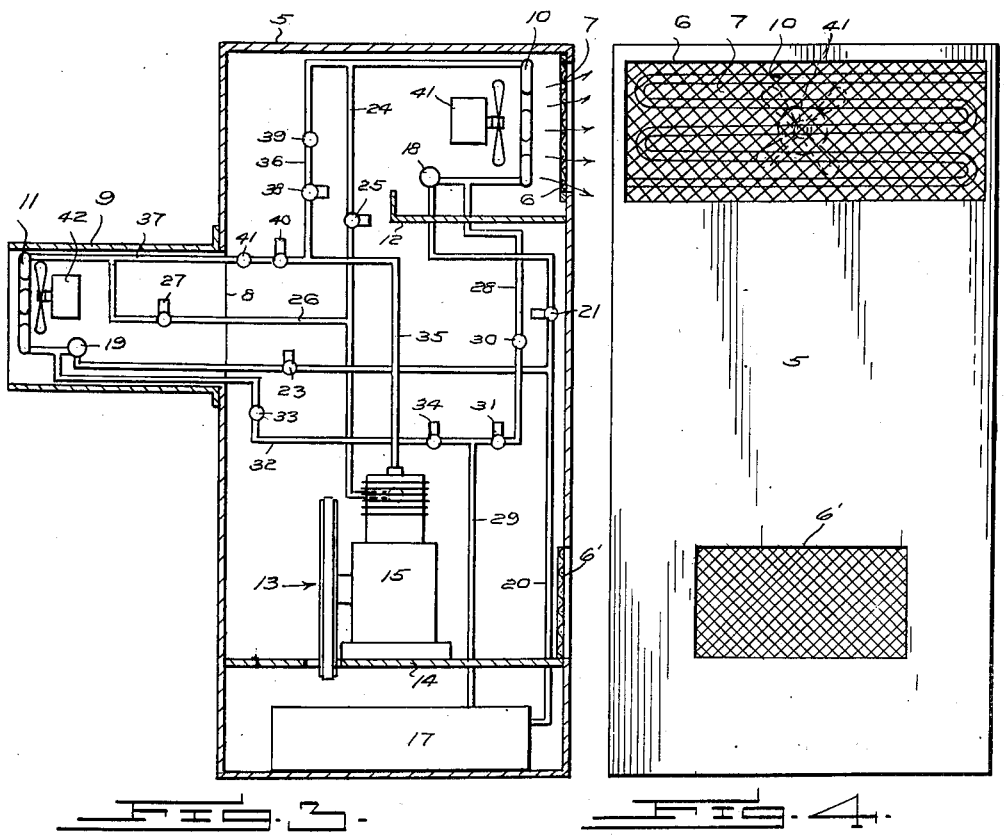
INVENTOR.
SALVATORE DESILVESTRO,
BY
ATTORNEY Patented Feb. 12, 1952

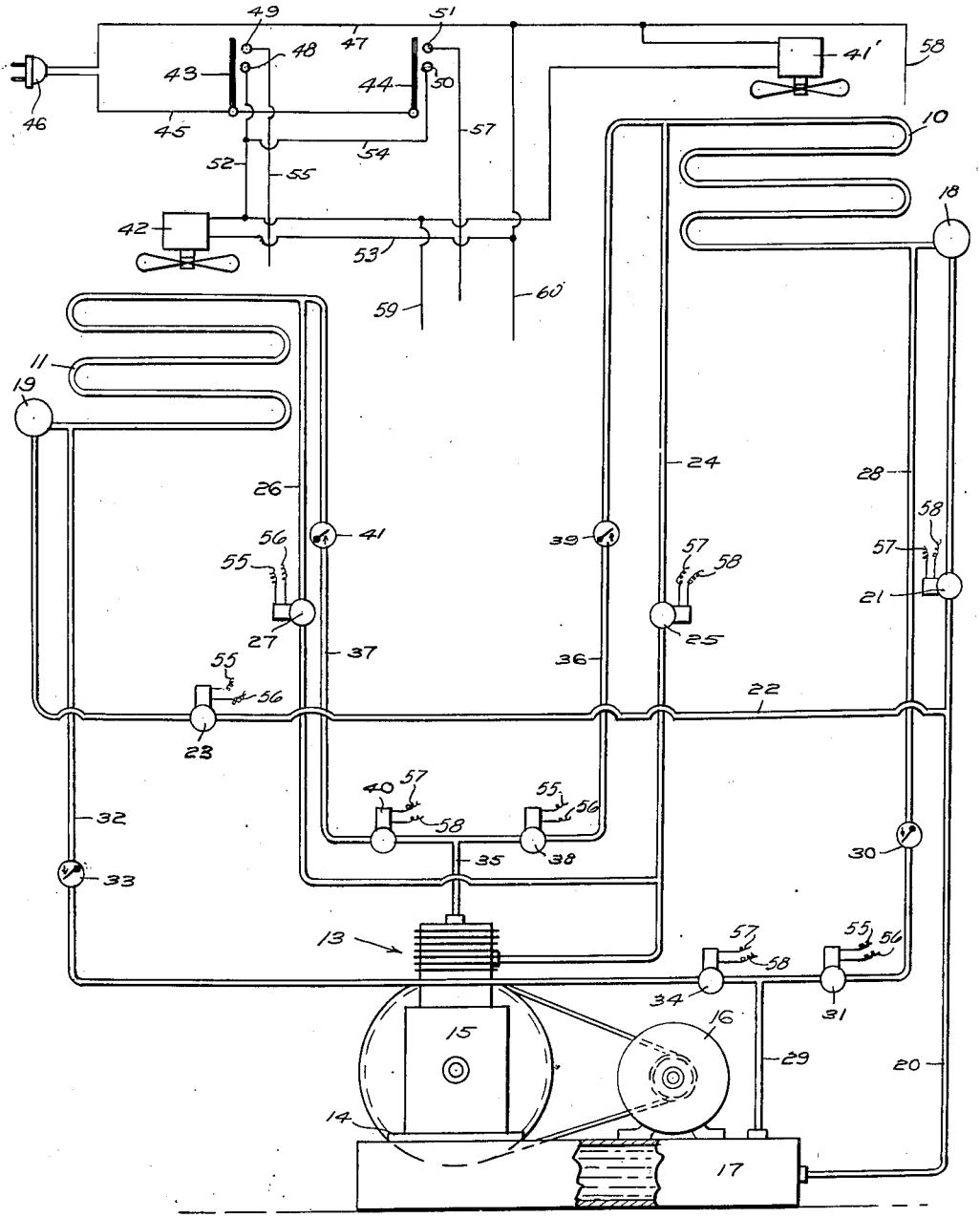

2,585,748

UNITED STATES PATENT OFFICE 2,585,748

AIR-COOLING AND HEATING APPARATUS

Salvatore De Silvestro, Miami, Fla.

Application October 6, 1948, Serial No. 53,063

2 Claims. (Cl. 62—6)

This invention relates to an improved combined air cooling and heating apparatus.

An object of the invention is the provision of a combined air cooling and heating apparatus employing a conventional refrigerating mechanism and associated elements whereby the cycle of operation may be reversed to provide a heat supply.

A further object of the invention is the provision of a system as above noted employing a fully closed circuit controlled by suitable thermostats for actuating either as an air cooling device or by a reverse cycle to function as a heating device.

The invention further contemplates certain combination and arrangements of fluid and gaseous circuits, thermostatically controlled valves, a refrigerating machine and means for automatically reversing the cycle of operation of the system for providing either air cooling or heating, all controllable by thermostats automatically and in accordance with the individual setting of the thermostats.

A further and important object of the invention resides in the provision of an apparatus as above identified, adapted to be incased in a suitable transportable housing, has no connection with water or gas lines, requires no fuel for the heating cycle or other heating means, may be conveniently moved from place to place and requires but a single conventional electric connector plug to the conventional house circuit.

Another important object of the invention resides in the extreme simplicity of the apparatus and the mechanical elements whereby a conventional refrigerating system may be so arranged and controlled as to provide both heated and cooled air from a single discharge opening in its enclosing housing.

Other and important objects and advantages will readily present themselves during the course of the following description, reference being had to the accompanying drawings, wherein:

Figure 1 is a semi-diagrammatic illustration of the invention removed from its casing, Figure 2 is a diagrammatic illustration of the electrical circuit for controlling the several valves and motors of the apparatus, Figure 3 is a vertical sectional view of a casing, illustrating the approximate positioning of the several parts of the apparatus, and Figure 4 is a front elevation of the casing of Figure 3, illustrating its air inlet and discharge openings.

Like numerals are employed to designate like parts throughout the several views of the drawing.

Referring specifically to the drawings, the numeral 5 designates a casing or housing for the mechanism, being preferably metallic and generally rectangular in shape. The casing 5 is provided with a rectangular shaped opening 6 on its forward side, adjacent the top, and this opening is preferably covered by a grill 7. A room air inlet opening 6' is also formed in the casing, as shown. The rear wall of the casing is provided with a generally rectangular opening 8, leading to a generally rectangular casing extension or conduit 9, open at its free end. The casing may be of any desirable shape and size and suitably ornamented for adaptation to a particular place of use.

Arranged slightly rearwardly of the grill 7 and preferably parallel therewith, is a tubular, preferably copper coil 10, while a similar coil 11 is arranged in the conduit 9 adjacent its open end and vertically positioned. A condensation drip pan 12 is positioned beneath the coil 10, as shown in Figure 3. The numeral 13 designates a compressor as a whole, embodying a base 14, compressor unit 15, motor 16, for driving the compressor 15 and fluid receiver tank 17. An expansion valve 18 controls the fluid passage to the lower run of the coil 10 while an expansion valve 19 controls the fluid entry to the lower run of the coil 11.

Referring particularly to Figure 1, a fluid conducting tube 20 leads from the receiver 17 to one side of the expansion valve 18. The opposite side of the valve 18 has connection with the lower run of the coil 10, as clearly shown. A solenoid valve 21 is arranged in the tube 20 for controlling the passage of fluid to the valve 18. It should be here stated, that the term fluid, refers to a commercial refrigerant. Leading from the tube 20, at a point between the receiver 17 and the solenoid valve 21, is a fluid conducting tube 22, having fluid connection with the expansion valve 19 on one side, while the expansion valve 19 has fluid connection with the lower run of the coil 11. A solenoid controlled valve 23 is positioned in the tube 22, to be actuated at a predetermined time for controlling the passage of the refrigerant therethrough. Leading from the upper run of the coil 10, is fluid conducting tube 24, having connection at its lower end with the inlet side of the compressor 15. A solenoid controlled valve 25 is positioned in this tube for controlling the flow of the expanded refrigerant from the coil 10. An expanded refrigerant conducting tube 26 leads from the upper run of the coil 11 and has connection in the tube 24 at a point between the valve 25 and the compressor. A solenoid controlled valve 27 is positioned in the tube 26 for controlling the flow of the refrigerant therethrough at predetermined times. A fluid return line 28 leads from the lower run of the coil 10, adjacent the expansion valve 18 for discharge into the receiver through a short tube 29. A downwardly opening check valve 30 is positioned in the tube 28 and a solenoid controlled valve 31 is positioned in the tube 28, between the valve 30 and tube 29. Leading from the lower run of the coil 11, adjacent the expansion valve 19, is a fluid conducting tube 32, also having connection with the tube 29. A downwardly opening check valve 33 is positioned in the tube 32 and a solenoid controlled valve 34 is likewise positioned in the tube at a point between the valve 33 and the tube 29.

Leading from the discharge end of the compressor 15 is a compressed refrigerant conducting tube 35, communicating with branch tubes 36 and 37. The tube 36 communicates with the upper run of the coil 10, while the tube 37 communicates with the upper run of the coil 11. A solenoid controlled valve 38 and an upwardly opening check valve 39 is arranged in the tube 36 for controlling the flow of the compressed refrigerant therethrough. A solenoid controlled valve 40 and an upwardly opening check valve 41 is arranged in the tube 37 for controlling the passage of the compressed refrigerant therethrough. Positioned rearwardly of the coil 10 for purposes of directing a current of air over the coil, is a blower fan 41, while a similar fan 42 is arranged to direct a current of air across the coil 11.

It is essential for the automatic control of the apparatus, that means be provided to actuate the several motors and solenoid controlled valves for a reversal of the cycle of operation of the system. To this end, a thermostatic switch 43 is employed for controlling the heating cycle of the system, while a thermostatic switch 44 is employed for controlling the air cooling cycle of the system. The switches 43 and 44 may be of any well known and conventional form and it is contemplated that the switch 43 shall be adjusted for circuit control when the prevailing temperature has dropped to a predetermined degree, while the switch 44 is adjusted for circuit control when the prevailing temperature has risen to a predetermined degree.

A common conductor wire 45, leads from a conventional electric plug-in device 36 and has connection with the movable elements of the thermostats 43 and 44. A common ground wire 47 leads from the plug-in device 46 to the several electrically controlled elements. Each of the thermostats embody a pair of contacts 48 and 49 and 50 and 51 respectively. In use, the thermostatically controlled elements are adapted to bridge the contacts 48 and 49 and the contacts 50 and 51 alternately, determined by the prevailing temperature. A conductor wire 52 leads from the contact 48 to the several motors 41', 42 and 16, while a ground wire 53 from the several motors has connection with the wire 47. A conductor wire 54 leads from the contact 50 to the wire 52. Thus, it will be seen, that when either of the thermostats are actuated to circuit closing position, the several motors will be placed in circuit, it being understood, that the actuation of the fans 41' and 42 and the compressor 15 is essential in either cycle of operation of the system.

As clearly shown in Figures 1 and 2, there have been employed eight solenoid controlled valves and, for a proper control of the system in either the air conditioning cycle or the heating cycle, the valves have been arranged in two groups of four to be electrically actuated as groups, it being obvious, that the solenoid valves will move to closed position when the circuit is interrupted. Leading from the contact 49 of the thermostat 43, is a conductor wire 55, commonly connected to one group of solenoid valves 23, 27, 31 and 38; while a common ground wire 56 connects the several valves 23, 27, 31 and 38 to the wire 47. Leading from the contact 51 of the thermostat 44, is a conductor wire 57, common to that group of solenoid controlled valves 21, 25, 34 and 40, while a common ground wire 58 connects the several valves 21, 25, 34 and 40 to the wire 47. Wires 59 and 60 serve to conduct current to the motor 16 when either of the thermostats are actuated. Thus, it will be seen, that when the thermostat 43 is actuated by a predetermined temperature condition, the several motors 41', 42 and 16 are placed in operation and the valves 23, 27, 31 and 38 are moved to open position. This controls the heating cycle. When the temperature condition is such as to cause the thermostat 44 to bridge its contacts 50 and 51, it will be obvious that the thermostat 43 will be inactive. When this occurs, all the valves 23, 27, 31 and 38 will have been moved to closed position. When the contacts 50 and 51 are bridged, the several motors 41', 42 and 16 are placed in operation and the group of valves 21, 25, 34 and 40 are moved to open position, thus actuating the system on the air cooling cycle or a reverse flow of the refrigerant.

In use, the casing containing the elements of the dual cycle system is placed adjacent a window opening, tho any other opening will suffice, so long as the conduit 9 may project to the atmosphere. The thermostats 43 and 44 are adjusted to their proper functioning temperatures, with the thermostat 43 adjusted to make contact when the temperature has dropped to a predetermined low, while the thermostat 44 is adjusted to make contact when the temperature has risen to a predetermined high. The connector 46 is then plugged into a convenient receptacle. The device is now ready for continued operation within the ranges of the thermostats.

Assuming that the temperature has risen sufficiently high to cause the thermostat 44 to function for bridging its contacts 50 and 51, current will flow to the several motors 16, 41' and 42, setting the compressor 15 in operation, the fans 41' and 42 and causing the valves 21, 25, 34 and 40 to open. Liquid refrigerant then flows from the receiver 17, through tube 20 to the expansion valve 18, is expanded into the coil 10 and then passes from the upper run of the coil to the tube 24 and then to the intake side of the compressor 15. This flow is possible, since the valves 21 and 25 are now open. The refrigerant is then compressed by the compressor and passes in gaseous form through tube 35 and tube 37 to the upper run of the coil 11, since the valve 40 is now open.

The gas is condensed in the coil 11 and then passes through tube 32 and tube 29, back to the receiver 17, since the valve 34 is now open. This is the air cooling cycle and, during this cycle, the coil 10 is a cooling coil, with the fan 41' directing a flow of air thereacross to the area to be cooled, while the coil 11 serves as a condenser coil for the refrigerant, with the fan 42 pulling a current of air thereover. This cooling cycle is maintained so long as the temperature remains sufficiently high to cause the thermostat 44 to remain in contacting position. When the temperature drops below the predetermined actuating point for the thermostat 44, but not low enough for the actuation of the thermostat 43, the apparatus will remain inoperative, with all valves closed and all motors inactive.

When the temperature drops sufficiently or to the point where heat is desired, the thermostat 43 is actuated, causing all motors to operate and the group of valves 23, 27, 31 and 38 to open. Since the compressor is now working, refrigerant from the receiver 17 passes through the tube 20 and, since the valve 21 is closed, will flow through tube 22 to the expansion valve 19, it being understood that valve 23 is now open to permit this passage. The fluid is expanded in the coil 11 and passes to the intake side of the compressor 15 through tube 26, since valve 27 is now open. From the compressor 15, the refrigerant gas under compression passes through tube 35 and 36 to the upper run of the coil 10, since the valve 38 is open and the valve 40 is closed. The gas is condensed in the coil 10 and passes through tube 28 and the tube 29 back to the receiver. The flow through the tube 28 is permitted since the valve 31 is now open. This is the heating cycle and, during this cycle, the coil 11 serves as an evaporator, while the coil 10 serves as a condenser and imparts heat to the flow of air passing thereover. The check valves 30, 33, 39 and 41 serve to prevent the improper flow of the refrigerant. Air for discharge to the area to be heated or cooled is drawn through the conduit 9, passing over the coil 11. The coil 11 may be additionally cooled by conveying water from the drip pan 12 to drop upon the coil. This has not been shown, but obviously, the pan will require a drain and this condensate may be utilized in this manner. While there has been illustrated and described, a pair of thermostatic switches for automatically controlling the several electrical circuits, it will be apparent, that these circuits may be controlled by manually operated switches, with equal success. Or, manually controlled switches may be employed in conjunction with the thermostatic switches as an additional safeguard in the event a thermostatic switch failed to function properly.

It will be seen from the foregoing, that an extremely novel dual system of air cooling and heating has been provided. The system is entirely a closed one, depending on no external source of heat, such as gas or electrical heaters, has no external fluid circulating connections, employs a novel arrangement of electrically controlled valves, the alternate operations of which determine the reversal of the cycle of operation whereby the coil 10 serves the dual purpose of both a cooling and a heating coil, readily adapts itself to easily transportable cabinets of ornamental design, has few and simple parts requiring a minimum of attention and is highly efficient in use. The system readily adapts itself to various capacities, from the average home to commercial establishments.

While a preferred embodiment of the invention has been shown and described, it will be apparent that minor changes in the shape, size and arrangement of parts may be resorted to as fall within the terms or the scope of the subjoined claims.

Having described my invention, what I claim is:

1. A closed circuit cooling and heating system employing a circulating refrigerant, including a motor actuated compressor and a fluid receiver, a combined cooling and heating tubular coil and a combined condenser and evaporator tubular coil, expansion valves communicating with the lower run of each coil, a fluid conducting tube from the receiver to the expansion valve of the first named coil, a fluid conducting tube from the receiver to the expansion valve of the second named coil, solenoid controlled valves in each of the tubes, fluid conducting tubes from the upper run of each coil to the inlet side of the compressor, solenoid valves arranged in the last named tubes, gaseous conducting tubes from the compressor to the upper runs of each coil, solenoid controlled valves arranged in the last named tubes, check valves arranged in the last named tubes, fluid return tubes leading from the lower runs of the coils to the receiver, solenoid controlled valves positioned in the last named tubes, check valves positioned in the last named tubes, said solenoid valves alternately controllable in groups, a pair of thermostatic switches for controlling each group of valves, one group of solenoid valves causing a flow of the refrigerant through the coils and the compressor for cooling the first named coil and condensing in the second named coil, while the other group of solenoid valves causes a flow of the refrigerant for condensing in the first named coil and evaporating in the second named coil, blower fans for directing an air current across the coils, said fans and said compressor caused to operate upon actuation of either group of solenoid valves.

2. A reverse cycle refrigerating system embodying a pair of coils and a compressor and receiver for a refrigerant in a closed system, an expansion valve communicating with the lower run of one coil and an expansion valve communicating with the lower run of the other coil, a fluid conducting tube leading from the receiver to the expansion valve of one coil, a solenoid controlled valve in said tube, a fluid conducting tube leading from the receiver to the other of said expansion valves, a solenoid controlled valve in the tube, a fluid conducting tube leading from the upper run of one coil to the intake side of the compressor, a solenoid controlled valve in said tube, a fluid conducting tube leading from the upper run of the other coil to the intake side of the compressor, a solenoid controlled valve in said tube, tubes leading from the upper runs of both coils to the discharge side of the compressor, solenoid controlled valves in said tubes, check valves in the last named tubes, fluid return tubes leading from the lower runs of the coils to the receiver, solenoid controlled valves in the last named tubes, check valves in the last named tubes, said solenoid valves controllable alternately in two groups, one group of valves directing a flow of the refrigerant through the coils and compressor to cause one coil to serve as a cooling coil and the other coil to serve as a condenser coil, while the other group of valves serve to reverse the flow of the refrigerant to cause the cooling coil to become a condenser and the condenser coil to become an evaporator, blower fans for directing a current of air over the coils, a pair of thermostatically controlled switches, one of said switches adapted to electrically actuate one group of solenoid valves, while the other switch is adapted to electrically actuate the other group of solenoid valves, a motor for driving the compressor, the said fans and the said compressor motor being electrically connected to the said switches whereby the fans and motor will operate upon the actuation of either group of solenoid valves.

SALVATORE DE SILVESTRO.

REFERENCES CITED

The following references are of record in the file of this patent:

UNITED STATES PATENTS

| Number | Name | Date |
|---|---|---|
| 2,131,355 | Neeson | Sept. 27, 1938 |
| 2,143,687 | Cargo | Jan. 10, 1939 |
| 2,148,415 | Labberton | Feb. 21, 1939 |
| 2,182,691 | Cargo | Dec. 5, 1939 |
| 2,441,885 | Kemler | May 18, 1948 |

OTHER REFERENCES

"The Heat Pump," article by Philip Sporn and E. R. Ambrose, Figure 3, pages 68 to 78 inclusive in the January 1944 issue of Heating and Ventilating.